(12) United States Patent
Brown et al.

(10) Patent No.: US 8,082,144 B1
(45) Date of Patent: Dec. 20, 2011

(54) TAX CALCULATION EXPLANATION GENERATOR

(75) Inventors: Bradford R. Brown, San Diego, CA (US); Michael Wang, San Diego, CA (US); Michael A. Artamonov, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 1043 days.

(21) Appl. No.: 11/439,362

(22) Filed: May 22, 2006

(51) Int. Cl.
*G06F 17/27* (2006.01)

(52) U.S. Cl. .............. 704/9; 704/2; 705/19; 705/31; 714/38; 717/141; 717/143; 715/224; 715/234; 379/201.1

(58) Field of Classification Search .............. 705/19; 704/9, 2; 707/1; 717/143, 141; 714/38, 714/238; 715/224; 379/201.1
See application file for complete search history.

(56) References Cited

U.S. PATENT DOCUMENTS

| | | | |
|---|---|---|---|
| 5,640,501 A * | 6/1997 | Turpin | 715/224 |
| 5,875,334 A * | 2/1999 | Chow et al. | 717/141 |
| 6,185,582 B1 | 2/2001 | Zellweger | |
| 6,594,783 B1 * | 7/2003 | Dollin et al. | 714/38 |
| 7,080,062 B1 * | 7/2006 | Leung et al. | 1/1 |
| 7,100,112 B1 | 8/2006 | Winser | |
| 7,496,837 B1 | 2/2009 | Larcheveque et al. | |
| 2001/0014899 A1 * | 8/2001 | Fujikawa | 707/513 |
| 2002/0164006 A1 * | 11/2002 | Weiss | 379/201.01 |
| 2002/0198810 A1 * | 12/2002 | Roger | 705/36 |
| 2003/0033284 A1 * | 2/2003 | Warren et al. | 707/1 |
| 2003/0036912 A1 * | 2/2003 | Sobotta et al. | 705/1 |
| 2003/0055754 A1 * | 3/2003 | Sullivan | 705/31 |
| 2003/0061022 A1 * | 3/2003 | Reinders | 704/2 |
| 2003/0182102 A1 * | 9/2003 | Corston-Oliver et al. | 704/9 |
| 2004/0078271 A1 * | 4/2004 | Morano et al. | 705/19 |
| 2006/0080594 A1 | 4/2006 | Chavoustie et al. | |
| 2006/0212859 A1 * | 9/2006 | Parker et al. | 717/143 |

OTHER PUBLICATIONS

Nardi, Daniele, Serrecchia, Giuseppe, "Automatic Generation of Explanations for Spreadsheet Applications", IEEE, 1994 (7 pages).
Office Action for U.S. Appl. No. 11/494,915, mailed on Sep. 2, 2010 (20 pages).

* cited by examiner

*Primary Examiner* — Richemond Dorvil
*Assistant Examiner* — Michael C Colucci
(74) *Attorney, Agent, or Firm* — Osha • Liang LLP (57) ABSTRACT

A method for explaining a form that includes receiving input code, wherein the input code is associated with the form, processing the input code to create an explanation dynamically associated with the form, and outputting the explanation into a natural language.

21 Claims, 9 Drawing Sheets

TAX CALCULATION EXPLANATION GENERATOR

BACKGROUND

The typical computer system includes at least one processor and a memory device. Executing on the computer system are various types of applications, such as operating system applications and user-level applications. Certain user-level applications, such as spreadsheets, databases, web pages, and tax applications are designed around the concept of forms. A form corresponds to any type of document (html page, spreadsheets, etc.) in which functionality is achieved through a combination of fields and calculations. A field in a form stores a data value, which may be supplied by the user (or other outside resource), or calculated using an equation. A user-generated field is a field whose data value is entered by the user or outside resource. A calculated field is a field in which the data value is obtained from evaluating an equation, typically deriving the data value from other user-generated fields and/or calculated fields. Note that it is possible for a field to be both user-generated and calculated.

Before forms can be populated with data, the set of fields and their equations must be specified in the design of the form. This design specification may be represented using a declarative programming language. The equations may include mathematical expressions, function calls, conditional expressions, etc. For example, if the equation for the field is the sum of the previous three fields (e.g., field_1, field_2, field_3), then associated with the field is typically an equation representing the summation (e.g., field_4=field_1+field_2+field_3 or field_4=sum(field_1, field_2, field_3)). The equations may be entered by the user (e.g., a user of a spreadsheet application) or by a programmer (e.g., a programmer of a spreadsheet application).

Often, the interdependencies in a form are complicated. Specifically, the interdependencies between fields and the equations used in different fields are often not intuitive to programmers or users. This may be especially the case in a declarative specification where there is no explicit flow of control that decides which order the equations are evaluated. Accordingly, in order to understand a form and how the values of the fields within a form are generated, programmers often rely on long static diagrams that are produced by individuals who design the application. The static diagram describes a theoretical control flow of the application. Specifically, the actual control flow may be different from the design if an error is in the application or if the programmer makes a change without updating the design. One method for a programmer to understand a form is to have the code translated from program code into a natural language. A translation corresponds to a word per function conversion from code into a natural language. For example, the expression x=y+z+b translates into the statement "x equals y added to z added to b." Such translation allows a programmer to easily read complicated fields in a form in a familiar language.

In contrast to programmers who use static diagrams, users (e.g., users of a spreadsheet application) rely on static explanations that are produced by individuals writing the help files. The help files correspond to a snapshot of the description of the form at the time the form is created. The explanation found in the help files is static in nature. Specifically, the help file does not automatically change when the source code of an application is modified. Similarly, the explanations found in the help file remain static even when the forms that the help files are explaining are dynamic. When modifications are made to the form and a new version of the application is produced, each affected portion of a help file must be updated to ensure the help files are consistent with the form.

SUMMARY

In general, in one aspect, the invention relates to a method for explaining a form that includes receiving input code, wherein the input code is associated with the form, processing the input code to create an explanation dynamically associated with the form, and outputting the explanation into a natural language.

In general, in one aspect, the invention relates to a system for explaining a form that includes a form that includes input code, and a framework configured to obtain input code from the form, process the input code to create an explanation dynamically associated with the form, and output the explanation into a natural language.

In general, in one aspect, the invention relates to a computer usable medium having computer readable program code embodied therein for causing a computer system to receive input code, wherein the input code is associated with a form, process the input code to create an explanation, and output the explanation into a natural language.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Further, in the following description of embodiments of the invention, terms such as, such as trees, stacks, lists, nodes, and other terms associated with data structures are discussed. Those skilled in the art will appreciate, however, that the aforementioned terms are used to represent the properties of the corresponding data structure, such as a vector, array, linked memory references, stack, etc. For example, the term stack corresponds to any data structure, such as an array, stack, linked list, etc. in which a property of the structure is set so that the last element added to the stack is the first element removed from the stack. Accordingly, as shown in the above example, the actual data structures used for a particular term may vary.

In general, embodiments of the invention provide a method and apparatus for creating natural language explanations from input code. Specifically, in one or more embodiments of the invention, the input code describing the equations associated with the form fields is converted into a natural language explanation that a user may understand. A natural language explanation is not only a translation, but also a transformation of the input code. Specifically, when a simple translation of the input code is not sufficient, a natural language explanation may include different words and different ordering of the words from a translation. Further, a natural language explanation may include more or fewer words and may add or remove content in order to clarify the meaning for the user. More specifically, whereas a translation is a simple change on a word for word basis, a natural language explanation may correspond to a metamorphosis of the content of the original input code into a format that is intuitive for a user.

For example, a translation of the expression "x:=f1+f2+f3+f4" corresponds to "Add the value of f1 to f2. Add the value of f3 to the result. Add the value of f4 to the result. Put the result into x." In contrast, a natural language explanation of the above expression may correspond to "Add the values of f1, f2, f3, and f4. Put the result into x." in accordance with one or more embodiments of the invention. Thus, as shown in the example, an explanation may provide more intuitive and helpful information to the user.

Figure 1:
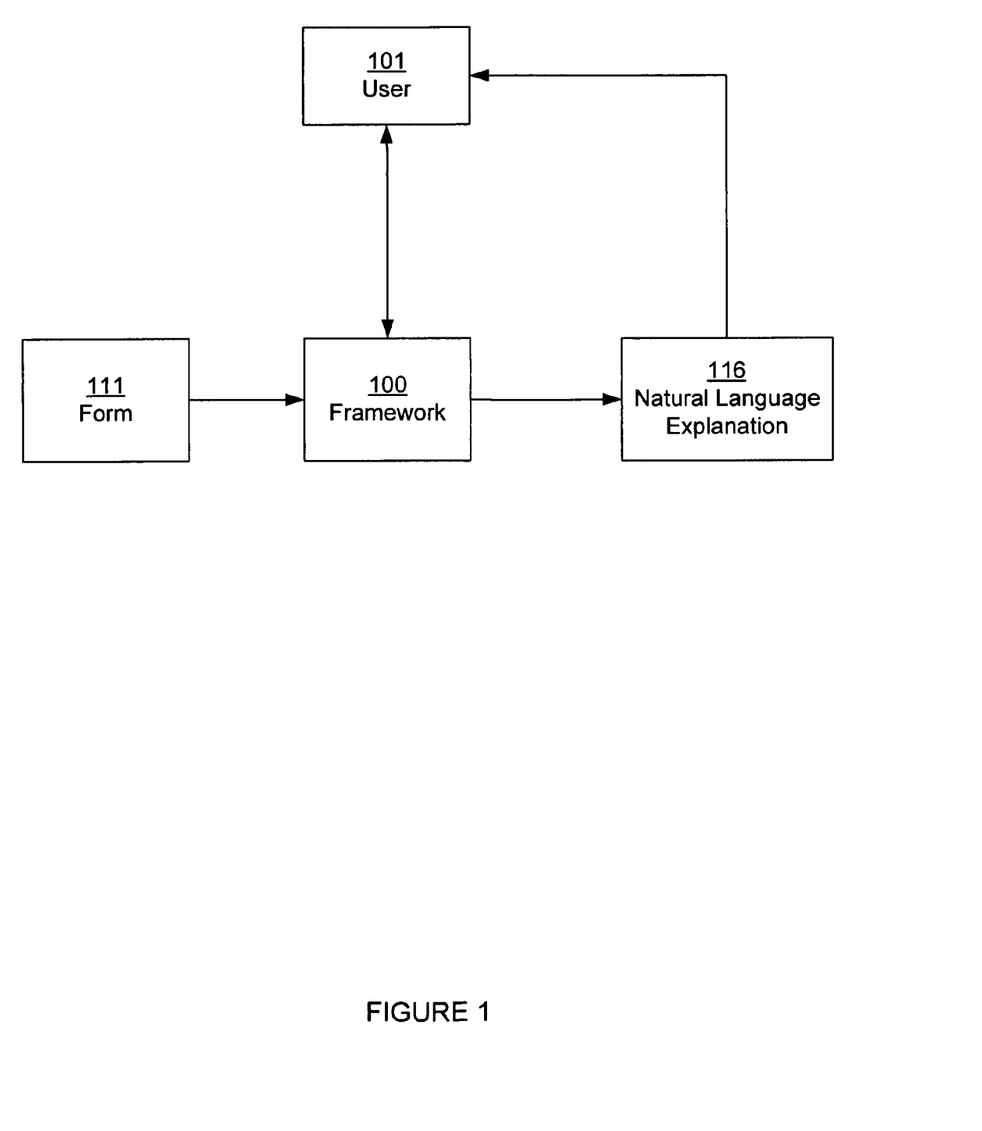
FIG. 1 shows a schematic diagram of a system for natural language explanation in accordance with one or more embodiments of the invention.

FIG. 1 shows a schematic diagram of a system for natural language explanation in accordance with one or more embodiments of the invention. As shown in FIG. 1, the system includes a user (101), a form (111), a natural language explanation (116), and a framework (100).

A user (101) corresponds to any individual that desires a natural language explanation (116). For example, a user (101) may correspond to a user of the form (111), a programmer of the form (111), a help file specialist, etc.

A form (111) corresponds to any type of document (html page, spreadsheets, etc.) in which functionality is achieved through a combination of fields and calculations. A field in a form (111) stores a data value, which may be supplied by the user (or other outside resource), or calculated using an equation. Those skilled in the art will appreciate that a field may correspond to such data entry containers as a field in an html form, a cell in a spreadsheet, etc. A user-generated field is a field whose data value is entered by the user or outside resource. A calculated field is a field in which the data value is obtained from evaluating an equation, typically deriving the data value from other user-generated fields and/or calculated fields. Note that it is possible for a field to be both user-generated and calculated.

A natural language explanation (116) corresponds to a description of the form (111) in a natural language. Specifically, the natural language explanation (116) includes the interdependencies between the fields of a form in a natural language. The natural language may correspond to any language that is understandable by humans. For example, the natural language may correspond to French, English, Greek, Arabic, Chinese, sign language, etc., in a visual, kinesthetic or auditory output. Further, the natural language explanation (116) may correspond to any format of output. For example, the natural language explanation may include textual descriptions, flow diagrams, or any other type of output that would explain the calculations of a form (111).

In one or more embodiments of the invention, the user (101) is operatively connected to a framework (100). The framework (100) corresponds to a component that includes functionality to receive as input the form (111) or portion thereof and produce the natural language explanation (116). In one or more embodiments of the invention, the framework (100) includes or is operatively connected to a user interface (not shown). The user interface for the framework (100) may correspond to a box within the form (111), a dynamic indicator (e.g., a virtual pointer that a user clicks on), or a separate application from the form (111) and the framework (100). In one or more embodiments of the invention, the user interface includes functionality to receive input from the user (100) specifying the specific fields in the form in which the user is interested. Specifically, the user interface includes functionality to obtain input code from the form (111). The input code corresponds to program code written in a programming language that describes one or more fields. The input code and framework (100) are described in detail in FIG. 2.

Figure 2:
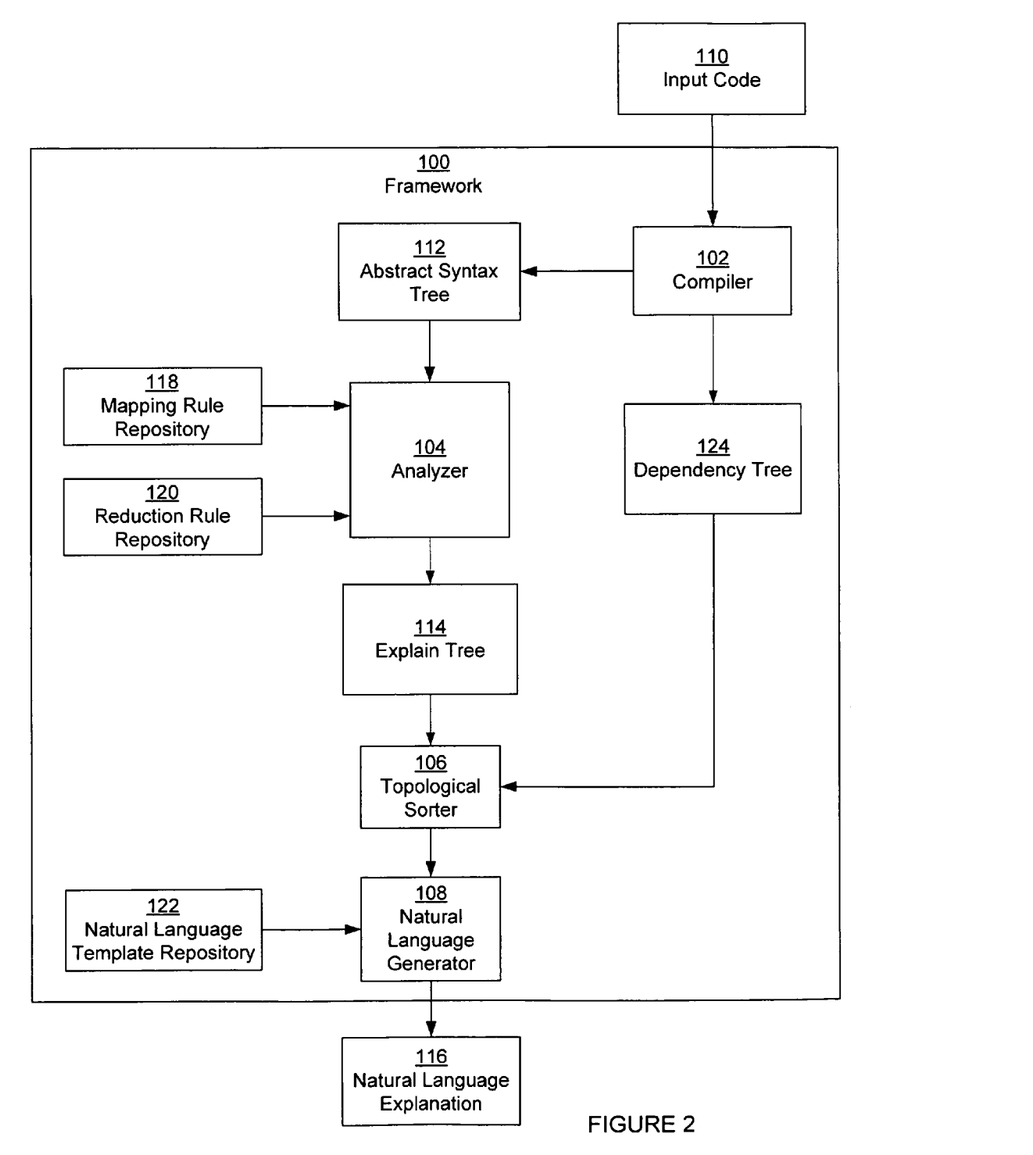
FIG. 2 shows a schematic diagram of a system for converting input code into natural language in accordance with one or more embodiments of the invention.

FIG. 2 shows a schematic diagram of a system for converting input code (110) into natural language explanation (116) in accordance with one or more embodiments of the invention. In one or more embodiments of the invention, from a programming perspective, the input code (110) corresponds to code describing equations and data for fields in form derived applications. Specifically, the input code (110) may include equations, such as formulas, mathematical expressions, functions calls, conditional expressions, etc. An equation includes an operator and one or more parameters for the operator. An operator defines the type of operation and a parameter is the unit that is being operated. A parameter may be a constant, variable, reference to another field, another equation, etc.

A nested equation has an equation (e.g., operator and parameter(s)) as a parameter. One type of operator is an assignment operator. An assignment operator assigns a parameter to a field name. For example, in the assignment "field_1:=3," "field_1" and "3" are parameters of the assignment operator ":=". Accordingly, ":=" assigns the value 3 to field_1. Those skilled in the art will appreciate that the input code (110) may be written in virtually any programming language.

Further, each equation for a field may have another field as a parameter for the equation. Specifically, a dependent field may depend on one or more precedent fields. Accordingly, before the equation for the dependent field can be calculated, the equations for the precedent fields must be calculated. Those skilled in the art will appreciate that the precedent field may simultaneously be a dependent field and depend on other precedent fields.

Continuing with FIG. 2, from the programming perspective, the natural language explanation (116) may be outputted to the screen, file, a bubble within an application, etc. In one or more embodiments of the invention, the natural language output is divided according to fields and steps. Specifically, in such embodiments, a marker (e.g., numeric marker, auditory signal, visual indicator, etc.) may exist before each field.

Further, in one or more embodiments of the invention, each individual step of the natural language explanation (116) may be included in sentence form. Specifically, the natural language output has a separation of each of the nested equations (described above) into individual steps.

Thus, in one or more embodiments of the invention, the expression "field_1:=3+x" is changed to a two-step equation (i.e., in step 1, add 3 and x. In step 2, put the results into field_1). The natural language explanation (116) may include either the references to the fields and/or data already entered in the fields. Specifically, when a field is dependent on a precedent field, then the natural language output includes the data already entered in the precedent field or simply the reference to the precedent field.

As shown in FIG. 2, a framework (100) for converting the input code (110) into natural language explanation (116) includes a compiler (102), an analyzer (104), a topological sorter (106), and a natural language generator (108). Each of these components is described below.

The compiler (102) corresponds to an application that includes functionality to parse input code (110) and obtain an abstract syntax tree (AST) (112). An abstract syntax tree (AST) (112) as used herein may correspond to any type of compiled tree structure (e.g., a parse tree, abstract syntax tree as understood and used by one skilled in the art, etc.). Further, an abstract syntax tree is composed of compiled tree structure nodes (hereinafter referred to as "AST nodes"). In one or more embodiments of the invention, the compiler (102) corresponds to a compiler from a third party vendor. Specifically, the compiler (102) may also include functionality to translate the input code (110) written in a programming language into machine code designed to execute on a particular computer system (i.e., with a particular processor, operating system, etc.). Accordingly, the abstract syntax tree (112) may correspond to a by-product of the compilation of the input code (110).

Further, the compiler (102) is also operatively connected to a dependency tree (124). Specifically, the compiler (102) may include the functionality to create a dependency tree (124) or may be operatively connected to an intermediate processing engine that includes functionality to create a dependency tree (124). A dependency tree (124) represents the field dependencies. A dependency tree (124) includes one or more dependency nodes (not shown). Specifically, dependency nodes in the dependency tree (124) identify a field in accordance with one or more embodiments of the invention. When a dependent field in the input code (110) has one or more precedent fields as parameters in the equation defining the dependent field, then the precedent fields are children of the dependent field in the dependency tree (124). For example, consider the case when field_1:=3+field_2 and field_2:=sum(a, b, c). In the example, field_1 is dependent on precedent field_2. Accordingly, a dependency node in the dependency tree representing field_1 has a child dependency node in the dependency tree that represents field_2 in accordance with one or more embodiments of the invention.

Those skilled in the art will appreciate that the dependency tree may correspond to a graph structure that has for n field references, more than n+1 connections. Specifically, a field may be simultaneously dependent on another field in two different manners. For example, field_1 may be dependent on field_2 and field_3 and both field_2 and field_3 may be dependent on field_4. In such a scenario, a partially ordering exists on the dependency tree.

Further, those skilled in the art will appreciate that the dependency tree may not be completely connected. Specifically, a graphical structure representing the dependency tree may correspond to a forest or a disconnected graph. For example, if all of the input code includes field_1, field_2, and field_3, and field_1 is dependent on field_2 and field_3 is neither a dependent nor precedent field, then field_1 and field_2 are connected in a single graphical structure and field_3 forms a separate graphical structure in accordance with one or more embodiments of the invention. Alternatively, those skilled in the art will appreciate that the two graphical structures in the aforementioned example may be linked in an arbitrary manner.

Continuing with FIG. 2, an analyzer (104) corresponds to an application that includes functionality to convert the abstract syntax tree (112) into a explain tree (114) (described below). The analyzer (104) is operatively connected to a mapping rule repository (118) and a reduction rule repository (120).

The mapping rule repository corresponds to a storage unit (e.g., a table, database, listing, etc.). The mapping rule repository (118) includes rules for mapping each operator and parameter into a classification of a type of object. For example, in one or more embodiments of the invention, the "+", "−", "*" operators maps to arithmetic objects. As another example, an AST node describing a field (e.g., "field_2"), may have an entry in the mapping rule repository (118) that specifies a field name maps to a "DSfieldRef" object.

The reduction rule repository (120) corresponds to a storage unit that includes rules for recognizing the parameters of an object. Specifically, the reduction rule repository includes information regarding which objects are parameters of other objects. For example, in one embodiment of the invention, the "if" statement maps to a "selector" object in the mapping rule repository (118). The reduction rule repository (120) may include the rule that the "selector" object has parameters of one predicate object and two expression objects in accordance with one or more embodiments of the invention.

Continuing with FIG. 2, an explain tree (114) corresponds to a tree composed of explain nodes and the relationship between the explain nodes. An explain node in the explain tree (114) corresponds to an object mapped from the AST nodes in the abstract syntax tree (112). Accordingly, two explain nodes may be related in the explain tree (114) if the corresponding AST nodes are related in the abstract syntax tree (112). In one or more embodiments of the invention, the explain tree (114) is dynamic. Specifically, further transformations may be applied to explain sub-trees. In one or more embodiments of the invention, a transformation of the sub-tree may correspond to collapsing the sub-tree into a member variables creating a single explain node with the information from the sub-tree as the member variables. Accordingly, a member variable of an explain node in the explain tree (114) may correspond to one or more explain nodes, a value, or another attribute of the object mapped from the AST node. In one or more embodiments of the invention, a explain tree (114) is considered reduced when the explain nodes in the explain tree corresponds to only assignment objects.

A topological sorter (106) is operatively connected to the dependency tree (114). The topological sorter (106) corresponds to an application that includes functionality to arrange the explain nodes in the explain tree (114) into an ordered output list. Specifically, the topological sorter (106) includes functionality to arrange the explain nodes in a manner that is not only arithmetically correct but is also intuitive to the user. More specifically, in one embodiment of the invention, each dependent field is near and after the precedent field(s) of the dependent field. For example, if field_1 is dependent on field_2 and field_3, and field_2 is dependent on field_4 and field_5, then in one or more embodiments of the invention, the ordered output list may correspond to the sorted output list (field_4, field_5, field_2, field_3, field_1). Those skilled in the art will appreciate that different sequences are intuitive to different users.

Operatively connected to the topological sorter (106) is a natural language generator (108). The natural language generator (108) includes functionality to translate the sorted output list of explain nodes into natural language output (110) (described above).

A natural language template repository (122) is associated with the natural language generator (108). The natural language template repository is a storage unit for templates. Specifically, for each explain node with member variables, there is at least one template that specifies how the explain node converts into at least one natural language sentence in accordance with one or more embodiments of the invention. More specifically, in one or more embodiments of the invention, each explain node, with certain object types as member variables, has a template.

Those skilled in the art will appreciate that while FIG. 2 shows the compiler (102) as part of the framework (100), the compiler (102) may be outside of the framework (100). Specifically, the input code (110) may be already processed by the compiler (102) before sent to the framework (100) in accordance with one or more embodiments of the invention.

Figure 3:
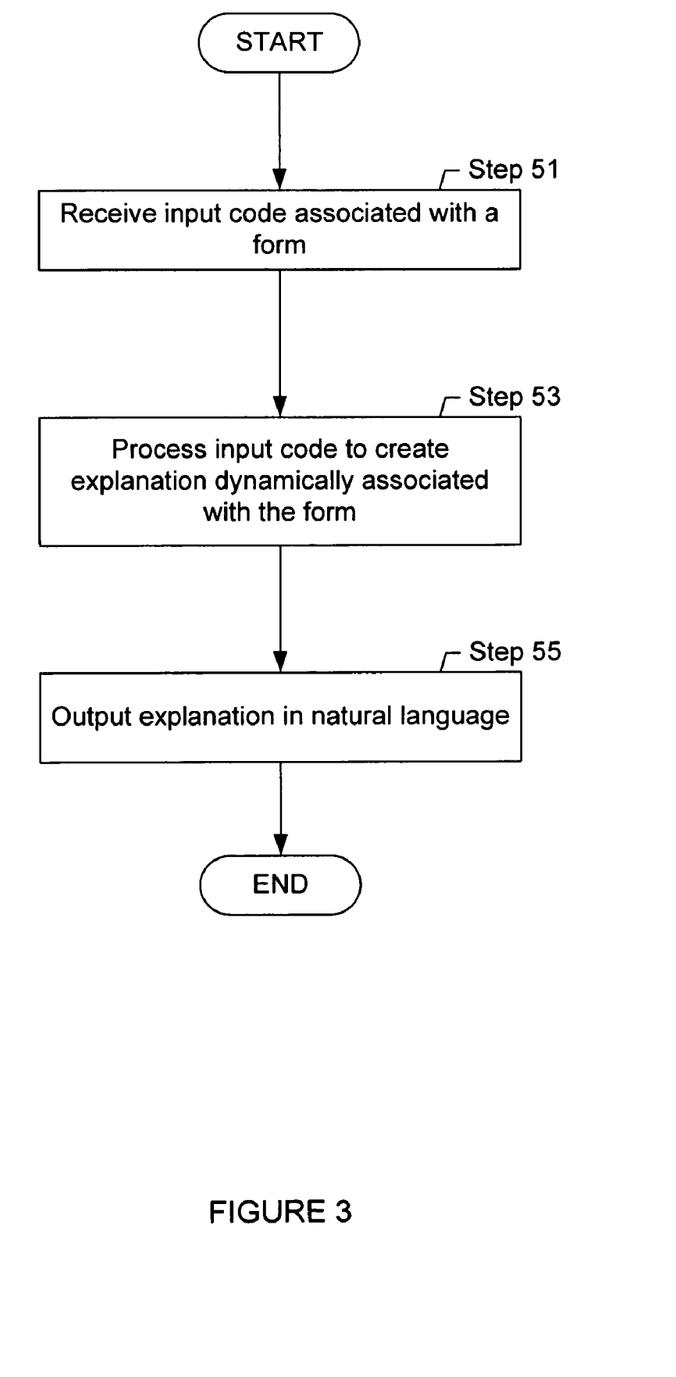
FIG. 3 shows a flowchart of a method for natural language explanation in accordance with one or more embodiments of the invention.

FIG. 3 shows a flowchart of a method for natural language explanation in accordance with one or more embodiments of the invention. Specifically, FIG. 3 shows a method for converting input code into a natural language explanation in accordance with one or more embodiments of the invention. Initially, input code associated with a form, or group of forms, is received (Step 51). Input code may be received by a user accessing the user interface and requesting a translation of all fields or specific fields of a form. When the request is received, then the input code is obtained from the form according to the request. Specifically, the input code associated with the requested fields is obtained. Alternatively, a programmer, for example, may type in a command with the input code as a parameter of the request.

After the input code is received, the input code is processed to create the explanation dynamically associated with the form (Step 53). Processing the input code creates the natural language explanation for the input code. A method of processing the input code to create the natural language explanation is described below in FIG. 4 in accordance with one or more embodiments of the invention.

Next, explanation is outputted in a natural language (Step 55). Specifically, in one or more embodiments of the invention, the explanation is outputted in a natural language and format that is requested by the user. The explanation may be outputted to a file, screen, speaker system, multimedia system, etc. Further, in one or more embodiments of the invention, the explanation may include data that a user has previously entered or data that can be calculated.

Figure 4:
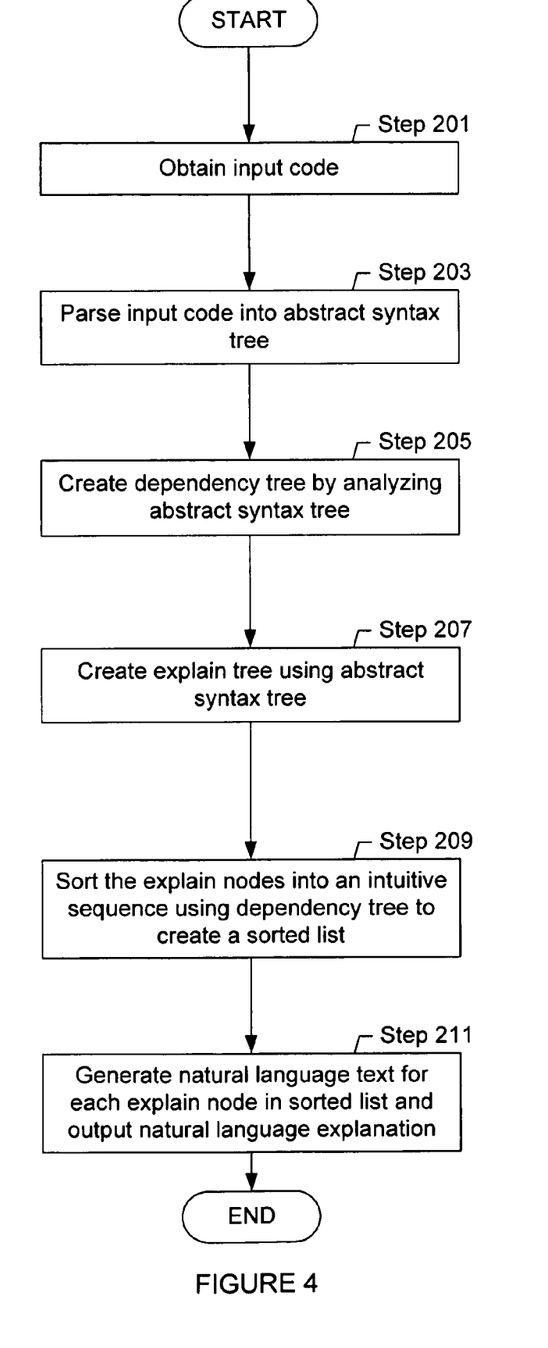
FIG. 4 shows a flowchart of a method for converting input code into natural language in accordance with one or more embodiments of the invention.

FIG. 4 shows a flowchart of a method for converting input code into a natural language explanation in accordance with one or more embodiments of the invention. Initially, the input code is obtained (Step 201). Obtaining the input code can be performed in a variety of ways known in the art. For example, the input code or a link may be obtained by a user or program using a user interface, an application programming interface, etc. The input code that is obtained may correspond to a part or all of an application. For example, because a user may specify that only a portion of the application should be translated, the input code that is obtained may correspond to the portion that should be translated.

After the input code is obtained, the input code is parsed to obtain an abstract syntax tree (Step 203). Parsing the input code into the abstract syntax tree may be performed by a compiler using virtually any method known in the art. Those skilled in the art will appreciate that rather than creating the abstract syntax tree, the abstract syntax tree may be a by-product of a third party compiler. In either scenario, the abstract syntax tree is obtained.

Once the abstract syntax tree is obtained, the abstract syntax tree is analyzed to create a dependency tree (Step 205). Creating the dependency tree can be performed for example, by identifying the nodes that have an assignment operator in the abstract syntax tree. For each assignment node, the field name that is the object of the assignment operator becomes a newly-created dependency node in the abstract syntax tree. Field name(s) that correspond to parameters of the assignment operator become parents of the newly created node in accordance with one or more embodiments of the invention.

Figure 5:
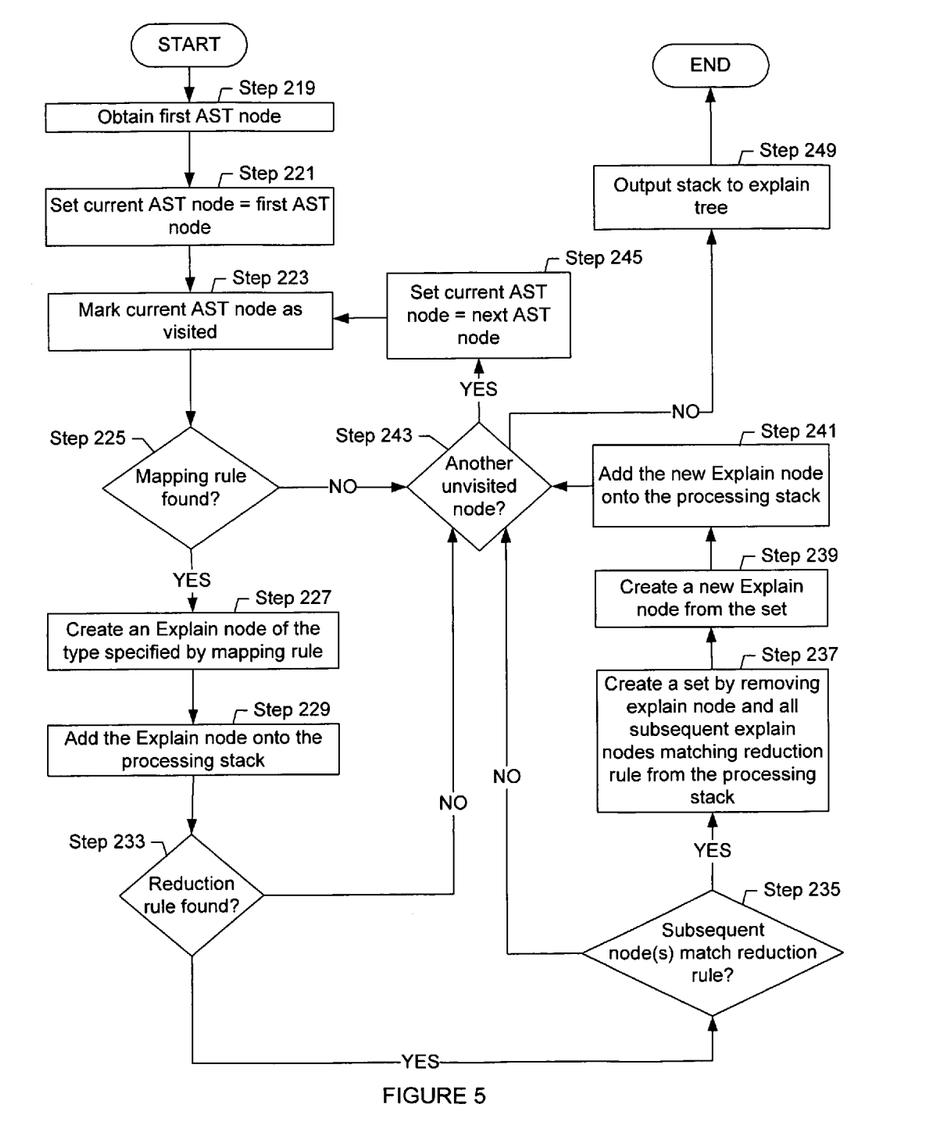
FIG. 5 shows a flowchart of a method for creating an explain tree in accordance with one or more embodiments of the invention.

In one or more embodiments to the invention, in addition to the dependency tree, an explain tree is created using the abstract syntax tree (Step 207). Those skilled in the art will appreciate that the explain tree may be created before, during, or after the dependency tree is created. In one or more embodiments of the invention, the explain tree is created by applying the mapping rules to the syntax nodes in the abstract syntax tree to create explain nodes and reducing the newly created explain nodes. FIG. 5 shows a flowchart of a method for creating an explain tree in accordance with one or more embodiments of the invention.

As shown in FIG. 5, the first AST node is obtained (Step 219). The first node is typically a leaf node from the abstract syntax tree. Specifically, in accordance with one or more embodiments of the invention, creating the dependency tree from the abstract syntax tree is performed by performing a post order traversal of the abstract syntax tree. In a post order traversal, the children AST nodes are visited before the parent AST nodes. Further, in one embodiment of the invention, the order of visiting the children AST nodes may be determined by the order of the children AST nodes in the input code. For example, if the equation is "3+5", then the AST node representing "3" is visited. Next, the AST node for "5" is visited. Finally the AST node for "+" is visited. Those skilled in the art will appreciate that other traversals of the abstract syntax tree are also possible. Specifically, with modifications to algorithm, virtually any traversal of the abstract syntax tree may be used.

Continuing with FIG. 5, after obtaining the first AST node, the first AST node is set to be the current AST node (Step 221). The current AST node is then marked as visited (Step 223). Marking an AST node as visited may be performed by changing the value of a Boolean variable associated with the AST node. Next, a determination is made whether a mapping rule is found for the current AST node (Step 225). Determining whether a mapping rule is found may be performed by searching the mapping rule repository for the type of the AST node. Searching the mapping rule repository may be performed, for example, by a simple lookup in a table, performing a hash operation on the type of AST node, or other means known in the art. If a mapping rule does not exist for the current AST node, then in one or more embodiments of the invention, the current AST node is ignored and a determination is made whether another unvisited AST node exists (Step 243).

Alternatively, if a mapping rule is found for the current AST node, then an explain node of the type specified by the mapping rule is created (Step 227). Specifically, an object of the type specified in the mapping rule is instantiated with the data in the AST node as a member variable. For example, in one or more embodiments of the invention, if "field_1" is the current AST node, then an object of type DSfieldref is created with member variable "field_1". By maintaining the member variable, classification of AST nodes may be performed without loss of information.

After creating an explain node using the mapping rules, the created explain node is added to a processing stack (Step 229). Specifically, in one or more embodiments of the invention, the explain node is added to the top of the processing stack.

Next, a determination is made whether a reduction rule is found for the explain node (Step 233). Determining whether a reduction rule is found for the explain node may be performed by a lookup in the reduction rule repository for the explain node. If a reduction rule is not found for the explain node then a determination is made whether another unvisited AST node exists (Step 243).

Alternatively, if a reduction rule is found for the current explain node, then a determination is made whether subsequent nodes in the processing stack of the current explain node match the reduction rule (Step 235). Specifically, the explain node(s) underneath the current explain node is examined to determine whether the node matches the reduction rule. More specifically, the explain nodes that match the reduction rule can only be contiguous on the stack in accordance with one or more embodiments of the invention. If the subsequent nodes of the current explain node do not match the reduction rule, then a determination is made whether another unvisited AST node exists (Step 243).

Alternatively, if the subsequent nodes match the reduction rule, then a set is created by removing the current explain node and the subsequent explain nodes that match the reduction rule from the processing stack (Step 237). In particular, the set includes the removed explain nodes. Next, a new explain node is created from the set (Step 239). Specifically, the removed subsequent explain nodes are set as member variables of the current explain node.

After resetting the children explain nodes, a determination is made whether another unvisited node exists in the abstract syntax tree (Step 243). Determining whether another unvisited node exists may be performed by determining whether the current node is the root of the abstract syntax tree. If the current node is the root of the abstract syntax tree, then all nodes have been visited in accordance with one or more embodiments of the invention.

Accordingly, the processing stack is outputted to create the explain tree (Step 249). In one or more embodiments of the invention, outputting the processing stack may be performed by iteratively removing each explain node from the processing stack and adding the removed explain node to the end of the explain tree. In one or more embodiments of the invention, the outputted explain tree corresponds to a list of explain nodes corresponding to assignment objects. In particular the reduction rules reduce the explain nodes to assignment nodes in accordance with one or more embodiments of the invention.

Alternatively, if the current node is not the root of the abstract syntax tree, then the current AST node has a parent. Because the abstract syntax tree is traversed with a post order traversal, the parent AST node of the current AST node is unvisited in accordance with one or more embodiments of the invention. Thus, a determination is made whether the parent AST node of the current AST node has any unvisited children. If the parent AST node has unvisited children, then one of the unvisited children is set as the current AST node (Step 245). Alternatively, if all children of the parent node are visited, then the parent AST node is set as the current AST node (Step 245). After setting an AST node as the current AST node, the current AST node is mark as visited (Step 223). When all nodes are visited, then the explain tree is complete.

Those skilled in the art will appreciate that while FIG. 5 describes a stack implementation for transforming the AST nodes into explain nodes, other implementations may also be used. For example, rather than adding explain nodes to the processing stack, the explain nodes may be added to the top of the explain tree directly.

In the tree implementation, reduction rules are applied to subtrees of the explain tree to determine whether the subtrees may be transformed into a representation more suitable for natural language translation. If the children match the reduction rule, then the children explain nodes are added as member variables to the current explain node. The children of the children explain nodes are then set as children of the current explain node.

Figure 6:
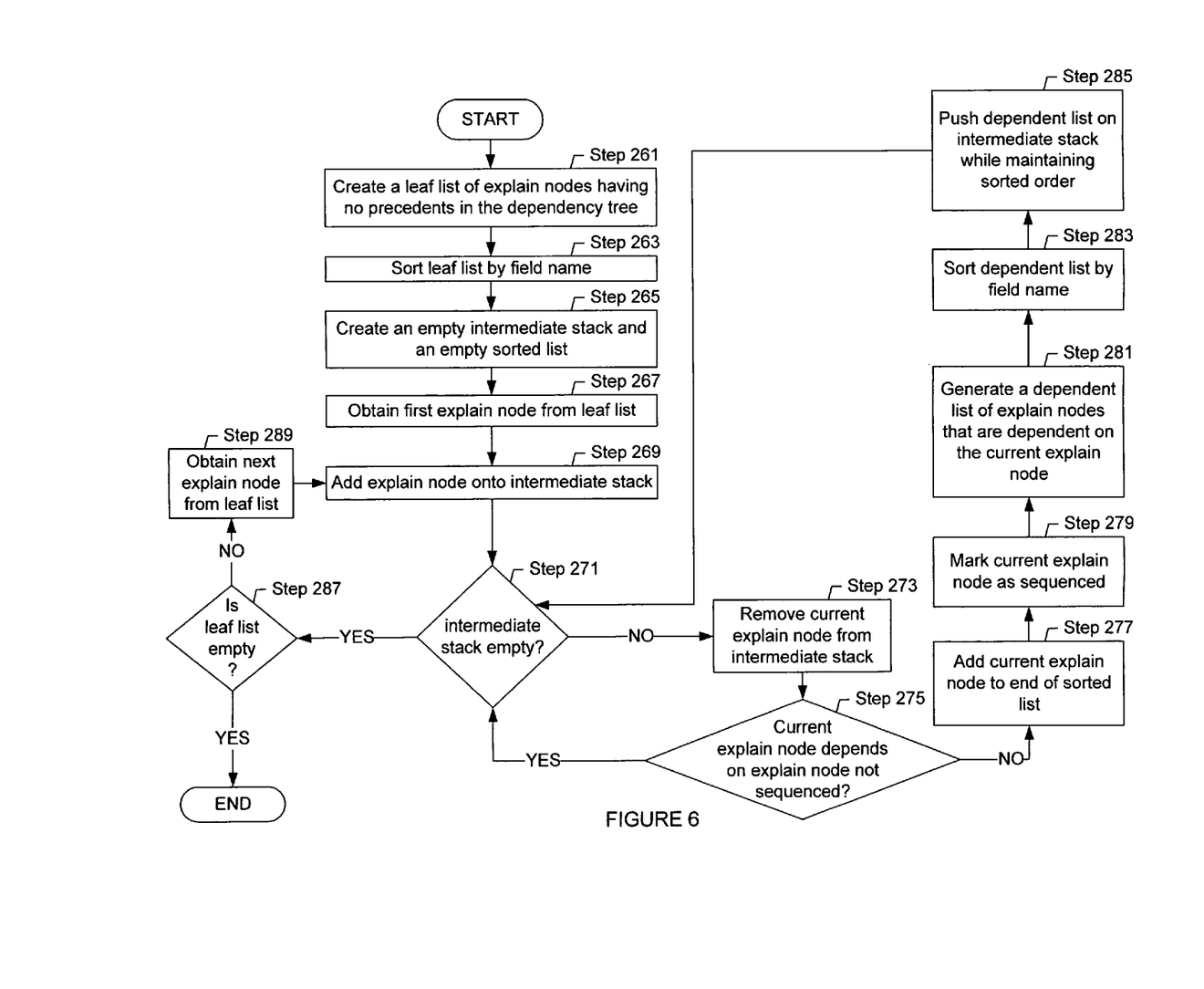
FIG. 6 shows a flowchart of a method for performing a topological sort of explain nodes in the explain tree in accordance with one or more embodiments of the invention.

Returning to FIG. 4, after creating the explain tree, the explain nodes in the explain tree are sorted into an intuitive sequence using the dependency tree to create a sorted output list (Step 209). FIG. 6 shows a flowchart of a method for performing a topological sort of explain nodes in the explain tree in accordance with one or more embodiments of the invention.

As shown in FIG. 6, initially a leaf list of explain nodes that do not have precedents in the dependency tree are created (Step 261). One method for creating the leaf list is to determine which nodes in the dependency tree do not have children. The leaf list may be created by traversing the dependency tree. When a dependency node is determined to not have children, then the explain node in the explain tree that corresponds to the field reference is added to the leaf list.

Continuing with FIG. 6, the leaf list is sorted by field name (Step 263). Specifically, as previously discussed, the reduction rule has removed non-assignment explain nodes and set the non-assignment explain nodes as member variables of the assignment explain nodes. Therefore, the explain tree has only assignment explain nodes in accordance with one or more embodiments of the invention. Accordingly, the leaf list may be sorted by the member variable specifying the field name corresponding to the assignment operator.

After sorting the leaf list by field name, an empty intermediate stack and empty sorted list is created (Step 265). Next, the first explain node from the leaf list is obtained (Step 267). Then, the first explain node is added (e.g., pushed) to the intermediate stack (Step 269). After adding the first explain node to the stack, a determination is made whether the intermediate stack is empty (Step 271).

If the stack is not empty, then the first explain node is removed (e.g., popped) from the intermediate stack and set as the current explain node (Step 273). Next, a determination is made whether the current explain node depends on a precedent explain nodes not sequenced (Step 275). Determining whether the current explain node depends on at least one precedent explain node not yet sequenced may be performed by traversing the dependency tree and determining whether all dependency nodes that are children of the dependency node with the field name of the current explain node are marked as sequenced. If the current explain node does not depend on any precedent explain node not yet sequenced, then the current explain node is added to the end of the sorted list (Step 277).

Next, the current explain node is marked as sequenced (Step 279). In one or more embodiments of the invention, the dependency node that field name corresponds to the current explain node is marked as sequenced. Marking an explain node may be performed by changing a Boolean variable associated with the explain node or dependency node to "true".

After marking the current explain node as sequenced, a dependent list of explain nodes is generated (Step 281). The dependent list of explain node corresponds to the list of explain nodes that are dependent on the current explain node. The dependent list of explain nodes may be obtained by aggregating the field names of all direct and indirect dependents of the current explain node. The field name may then be used to obtain the explain nodes from the explain tree.

After obtaining the dependent list, the dependent list is sorted by the field name (Step 283). Specifically, the member variables corresponding to the field name are used to sort the dependency list.

Alternatively, the order of the dependency nodes may be maintained. For example, the explain node that corresponds to the dependency node at the root of the tree may be in the front of the dependent list, while the explain node(s) that is directly dependent on the current explain node is added to the end of the list.

Next, the set of explain nodes are added to the intermediate stack while maintaining the order specified in the tree (Step 285). For example, the first explain node in the dependency list is added to the intermediate stack first and the last explain node in the dependency list is added to the intermediate stack last in accordance with one or more embodiments of the invention.

After adding the dependency list to the intermediate stack, a determination is made whether the stack is empty (Step 271). The stack is typically empty when the current explain node is the root of the tree.

If the stack is not empty, then the method continues with the removing the next explain node from the stack and setting the next explain node as the current explain node (Step 273). Alternatively, if the stack is empty, then a determination is made whether the leaf list is empty (Step 287). If the leaf list is not empty, then more un-sequenced leaf explain nodes exist. Accordingly, the next explain node is obtained from the leaf list (Step 289). After obtaining the next explain node from the list, the next explain node is added to the stack (Step 269).

Alternatively, if the list is empty, then all of the explain nodes in the dependency tree are sequenced into a sorted list.

Those skilled in the art will appreciate that while FIG. 6 describes one method for sorting the explain nodes, other methods are also possible. Specifically, a different sorting algorithm may be used. The actual sorting algorithm that is used may be based on the type of ordered output list that is intuitive to the type of user. For example, if the type of user is a programmer, then an ordering that is intuitive may be based on the order of the equations as stated in the design of the form. Specifically, in the programmer example, explain nodes are near the explain nodes on which they are dependent. Alternatively, if the type of user is an application user, then the ordering that is intuitive may be based on the order of the field names as they are presented visually to the user. Specifically, in the application user example, the order may correspond to field_1, field_2, field_3, etc.

Figure 7A:
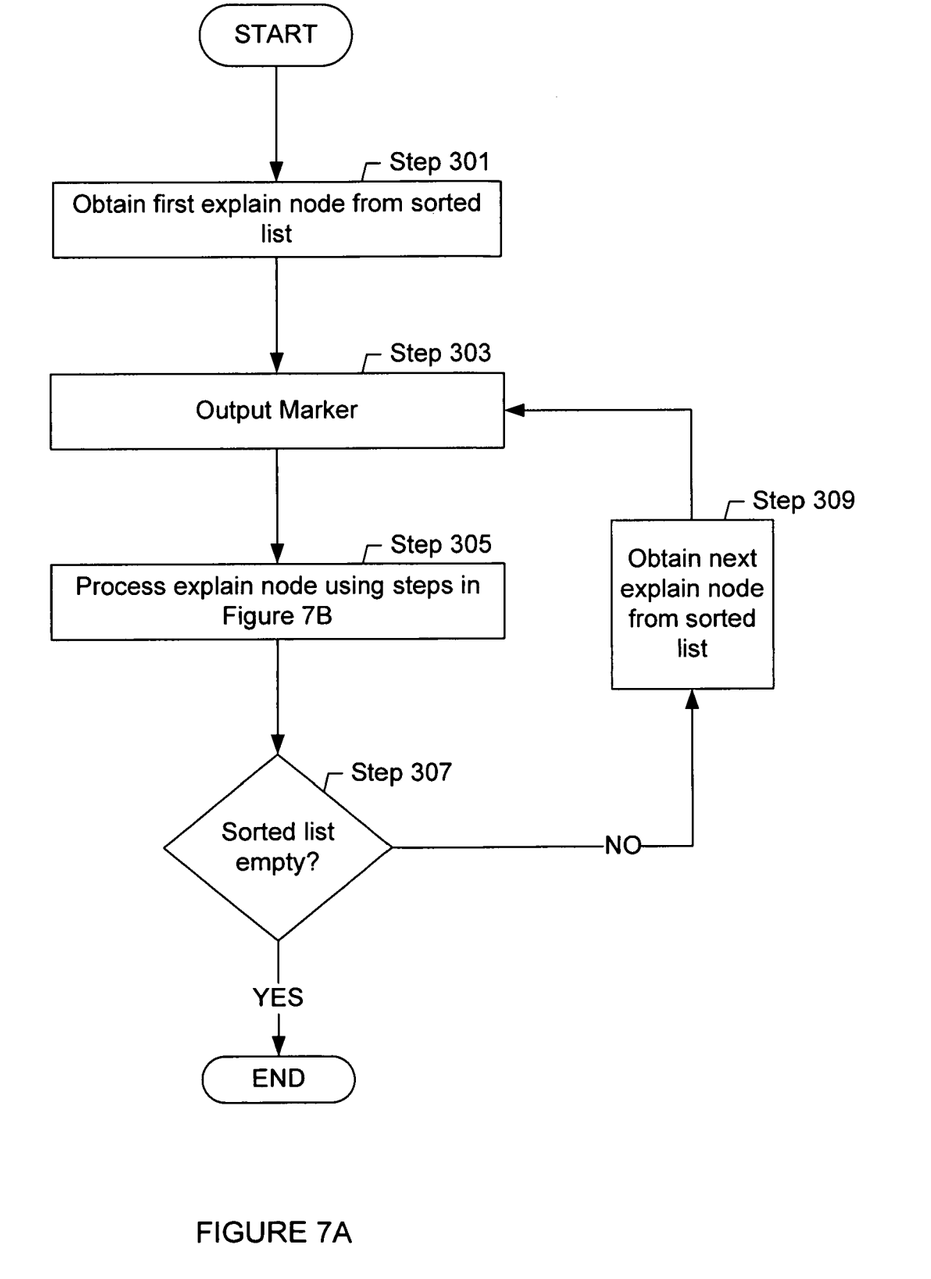
FIGS. 7A-7B show a flowchart of a method for generating natural language explanation of explain nodes in accordance with one or more embodiments of the invention.
Figure 7B:
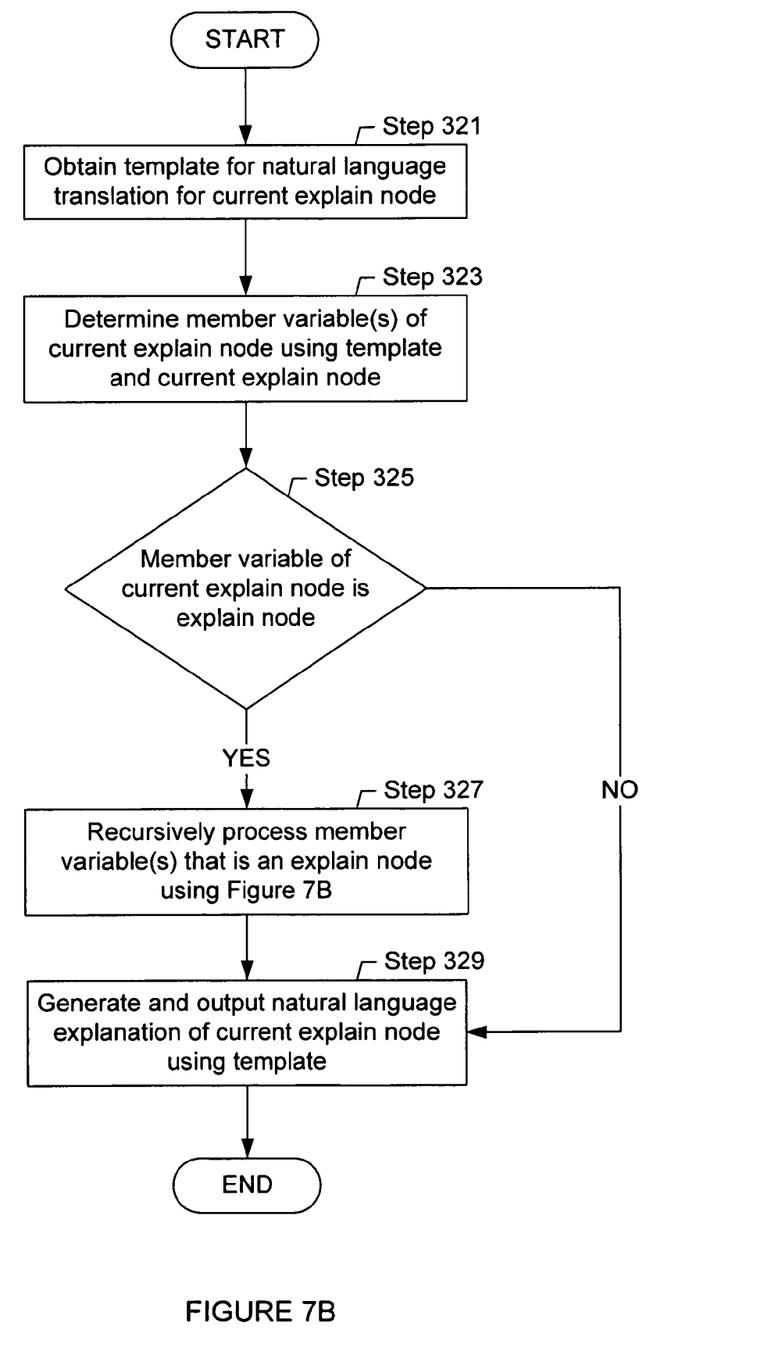

Returning to FIG. 4, after the sorted list is created, then a natural language explanation is generated for each explain node in the sorted list and the natural language explanation is outputted (Step 211). FIGS. 7A-7B show a flowchart of a method for generating natural language explanation of explain nodes in accordance with one or more embodiments of the invention. Specifically, FIG. 7A shows the steps of traversing the sorted list in accordance with one or more embodiments of the invention.

Initially, the first explain node is obtained from the sorted list (Step 301). Next, a marker is outputted (Step 303). The marker indicates that the equation (s) specified after the marker is for a specific field. Those skilled in the art will appreciate that outputting the marker is optional.

Next, the explain node is processed using the steps described in FIG. 7B. FIG. 7B shows a method for processing an explain node to generate a natural language explanation in accordance with one or more embodiments of the invention. For the purposes of FIG. 7B, the current explain node corresponds to the explain node currently being processed.

Initially, a template for the natural language explanation of the current explain node is obtained (Step 321). The template may be obtained, for example, by accessing the natural language repository. In one or more embodiments of the invention, the natural language repository has a single template that matches the explain node with the member variables of the explain node.

After obtaining the template, the member variables of the current explain node are determined using the template and the current explain node (Step 323). The member variables are the member variables of the current explain node. Next a determination is made whether any of the member variables correspond to an explain node (Step 325). Specifically, a determination is made whether the current explain node has nested explain nodes as member variables.

If the current explain node does have explain nodes as member variables, then the explain nodes that are member variables of the current explain node are recursively processed using the steps of FIG. 7B (Step 327). Specifically, each nested explain node is processed in order recursively using FIG. 7B. Those skilled in the art will appreciate that while FIG. 7B shows a recursive algorithm for processing an explain node, an iterative algorithm may also be used.

Once the member variables corresponding to explain nodes are processed or if no member variables exist that correspond to explain nodes, then the natural language explanation of the current explain node is generated and outputted using the template (Step 329). Specifically, the template specifies the filler words and the member variables specify the variable data to apply between the filler words in accordance with one or more embodiments of the invention.

Returning to FIG. 7A, once the natural language explanation is generated for the explain node in the sorted list, then a determination is made whether the sorted list is empty (Step 307). If the sorted list is not empty, then the next explain node is obtained from the sorted output list (Step 309). Alternatively, if the sorted output list is empty, then the natural language explanation is generated for all explain nodes.

Those skilled in the art will appreciate that the natural language explanation may be outputted by adding the natural language explanation to a file, printer, display, etc. Further, outputting the natural language explanation may be performed during or after generating the natural language explanation.

Those skilled in the art will appreciate that innumerable methods exist for implementing the natural language translation in accordance with one or more embodiments of the invention. Specifically, the aforementioned methods may be modified to improve performance using optimization principles known in the art.

In the following example, consider the scenario in which a user is expecting a refund when filing for taxes. Specifically, the user is using an application for the applicable tax forms. After finishing filing out the form, the field with the amount of the refund shows that the user owes money rather than receiving a refund. Further, a particular calculated field in the Internal Revenue Service Form 1040 does not show the value that the user would expect. Accordingly, the user wants to determine how the particular calculated field is determined. Specifically, the user may want to know which values and calculations on the values are in other fields that affect the particular field in which the user is interested.

Accordingly, the user submits a request with the particular field in the example. The input code is obtained and a dependency tree that includes the particular fields and the precedent fields of the dependent field is created in accordance with one or more embodiments of the invention. Next, the abstract syntax tree is created for the fields listed in the dependency tree.

After creating the abstract syntax tree, the explain tree is created. At this stage, the particular field and each precedent fields are represented as explain nodes with nested explain nodes in accordance with one or more embodiments of the invention.

Continuing with the example, the explain nodes are then sorted according to a user preference to create a sorted list. Because the user is interested in determining which calculations are relevant, the sorted list for the user is ordered in which each field found in the sorted list is near the precedent fields upon which it depends.

Once the sorted list of explain nodes is obtained, natural language explanation is generated for each explain node. After the natural language explanation is generated, field names are replaced with the values entered in the fields with the corresponding field names in accordance with one or more embodiments of the invention. The natural language explanation is then outputted for the user to view.

After reviewing the explanation, the user realizes that certain field values can be legally changed to produce a higher tax benefit. After changing the values, the user is satisfied because the user can now receive a refund.

Figure 8:
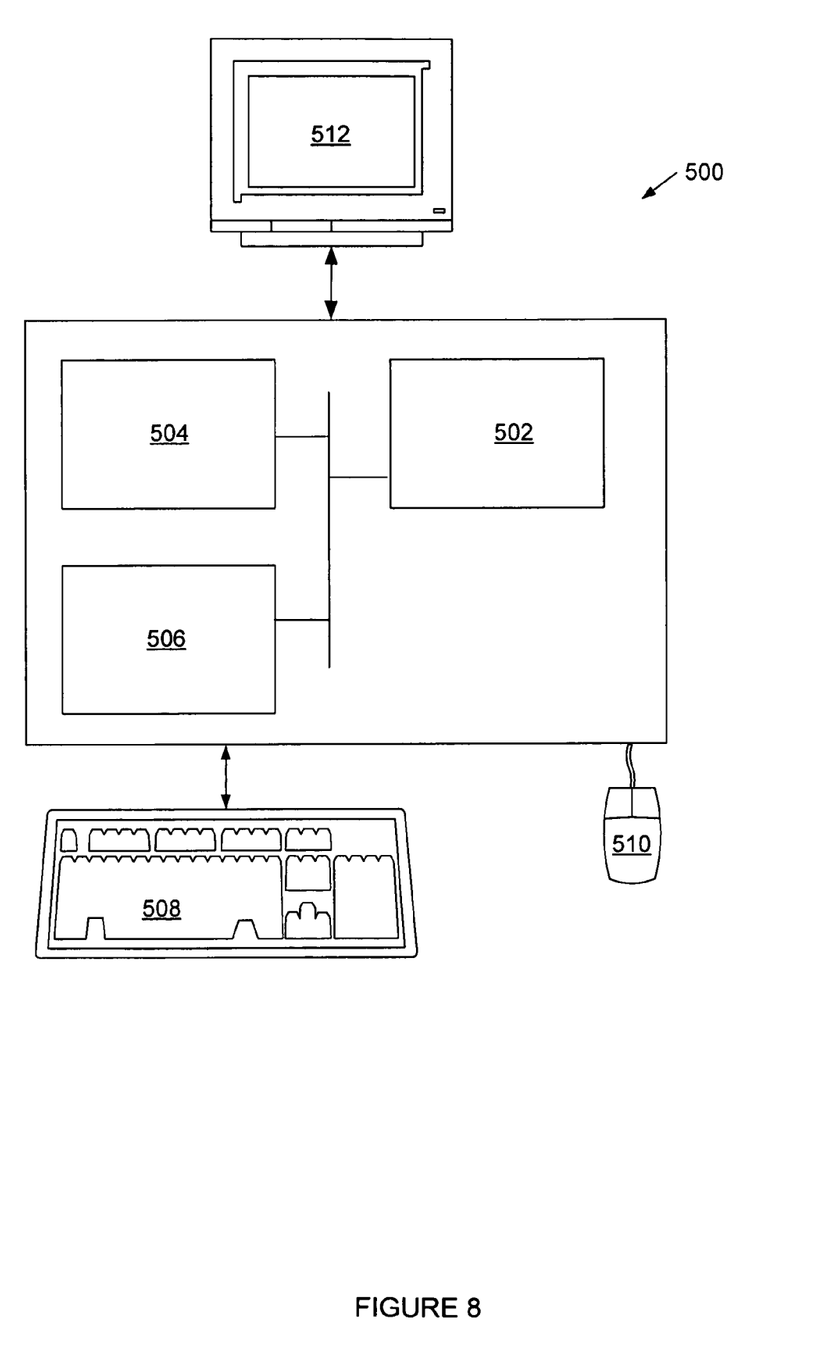
FIG. 8 shows a computer system in accordance with one embodiment of the invention.

The invention may be implemented on virtually any type of computer regardless of the platform being used. For example, as shown in FIG. 8, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., compiler, analyzer, input code, natural language translator, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer-readable medium such as a compact disc (CD), a diskette, a tape, a file, or any other computer-readable storage device.

Embodiments of the invention provide a method for creating a natural language explanation from a form. Specifically, by providing the natural language in a form more understandable than a simple translation, users are able to better understand a form. Moreover, users and programmers of official documents are able to visualize and understand in an intuitive manner how different fields are dependent on other fields. Further, embodiments of the invention add information not inherent in the input code. More specifically, by using a natural language template, embodiments of the invention add information that allows the natural language to be more readable to the user.

Furthermore, embodiments of the invention provide a mechanism whereby users are able to visualize which precedent fields have not been entered. Specifically, when a user accesses a dependent field and a precedent field(s) of the dependent field has not been entered with data, the user is able to see that the precedent field(s) has not been entered with data. Also, users are able to see how changes made in precedent fields affect the dependent fields. Specifically, by including both field references and data already inputted in the output, users are able to better understand the dependencies in the fields.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for explaining a field of a plurality of fields in a form comprising:
receiving input code, wherein the input code is executed by a computer to create data displayed in the plurality of fields in the form;
processing, by the computer, the input code to generate an explanation describing calculations performed when the input code is executed, wherein processing the input code to generate the explanation comprises:
obtaining an abstract syntax tree from the input code, wherein the abstract syntax tree describes the input code and comprises a plurality of compiled tree structure (AST) nodes, wherein each of the plurality of AST nodes identifies a portion of the input code;
obtaining an explain tree by:
transforming the plurality of AST nodes into a plurality of explain nodes, wherein the transforming the plurality of AST nodes comprises for each AST node of the plurality of AST nodes:
marking the AST node as a current AST node;
identifying a mapping rule corresponding to the current AST node,
wherein the mapping rule specifies an object type that maps to at least one selected from a group consisting of a plurality of operators and a plurality of parameters, and
wherein the mapping rule is identified based on the current AST node comprising at least one selected from the group consisting of an operator of the plurality of operators and a parameter of the plurality of parameters;
generating a new explain node of the plurality of explain nodes by instantiating the new explain node as the object type specified by the mapping rule, wherein the new explain node comprises data in the current AST node as a member variable; and
adding the new explain node to a processing stack; and storing, in the explain tree, the plurality of explain nodes remaining in the processing stack after the transforming of the plurality of AST nodes is complete;

sorting, using a dependency tree, the plurality of explain nodes in the explain tree to obtain a sorted list of the plurality of explain nodes, wherein the dependency tree represents field dependencies between the plurality of fields in the form, and wherein the sorted list comprises, for each dependent field of the plurality of fields, an explain node representing the dependent field after the explain node representing a precedent field of the dependent field; and generating the explanation of each explain node of the plurality of explain nodes in the sorted list by, for each explain node:

selecting a template matching the object type of the explain node, and generating the explanation comprising filler words from the template and the member variable comprised in the explain node; and outputting the explanation into a natural language.

2. The method of claim 1, wherein receiving the input code comprises receiving a request specifying the form, and wherein the input code is obtained from the form based on the request.

3. The method of claim 2, wherein the request is received by clicking on a button on the form.

4. The method of claim 1, wherein the explanation allows completion of the form.

5. The method of claim 1, wherein outputting the explanation is in text.

6. The method of claim 1, wherein outputting the explanation is graphically based.

7. A system for explaining a field of a plurality of fields in a form comprising:

a form comprising input code; and a framework configured to:

obtain the input code from the form, wherein the input code is executed by a computer to create data displayed in the plurality of fields in the form;

process the input code to generate an explanation describing calculations performed when the input code is executed, wherein processing the input code to generate the explanation comprises:

obtaining an abstract syntax tree from the input code, wherein the abstract syntax tree describes the input code and comprises a plurality of compiled tree structure (AST) nodes, wherein each of the plurality of AST nodes identifies a portion of the input code;

obtaining an explain tree by:

transforming the plurality of AST nodes into a plurality of explain nodes, wherein the transforming the plurality of AST nodes comprises for each AST node of the plurality of AST nodes:

marking the AST node as a current AST node;

identifying a mapping rule corresponding to the current AST node, wherein the mapping rule specifies an object type that maps to at least one selected from a group consisting of a plurality of operators and a plurality of parameters, and wherein the mapping rule is identified based on the current AST node comprising at least one selected from the group consisting of an operator of the plurality of operators and a parameter of the plurality of parameters;

generating a new explain node of the plurality of explain nodes by instantiating the new explain node as the object type specified by the mapping rule, wherein the new explain node comprises data in the current AST node as a member variable; and adding the new explain node to a processing stack; and storing, in the explain tree, the plurality of explain nodes remaining in the processing stack after the transforming of the plurality of AST nodes is complete;

sorting, using a dependency tree, the plurality of explain nodes in the explain tree to obtain a sorted list of the plurality of explain nodes, wherein the dependency tree represents field dependencies between the plurality of fields in the form, and wherein the sorted list comprises, for each dependent field of the plurality of fields an explain node representing the dependent field after the explain node representing a precedent field of the dependent field; and generating the explanation of each explain node of the plurality of explain nodes in the sorted list by, for each explain node:

selecting a template matching the object type of the explain node, and generating the explanation comprising filler words from the template and the member variable comprised in the explain node; and output the explanation into a natural language.

8. The system of claim 7, wherein obtaining the input code comprises receiving a request specifying the form, and wherein the input code is obtained from the form based on the request.

9. The system of claim 8, wherein the request is received by clicking on a button on the form.

10. The system of claim 7, wherein the explanation allows completion of the form.

11. The system of claim 7, wherein outputting the explanation is in text.

12. The system of claim 7, wherein outputting the explanation is graphically based.

13. A computer usable medium having computer readable program code embodied therein for causing a computer system to:

receive input code, wherein the input code is executed by a computer to create data displayed in a field of a plurality of fields in a form;

process the input code to generate an explanation describing calculations performed when the input code is executed, wherein processing the input code to generate the explanation comprises:

obtaining an abstract syntax tree from the input code, wherein the abstract syntax tree describes the input code and comprises a plurality of compiled tree structure (AST) nodes, wherein each of the plurality of AST nodes identifies a portion of the input code;

obtaining an explain tree by:

transforming the plurality of AST nodes into a plurality of explain nodes, wherein the transforming the plurality of AST nodes comprises for each AST node of the plurality of AST nodes:

marking the AST node as a current AST node;

identifying a mapping rule corresponding to the current AST node,
wherein the mapping rule specifies an object type that maps to at least one selected from a group consisting of a plurality of operators and a plurality of parameters, and
wherein the mapping rule is identified based on the current AST node comprising at least one selected from the group consisting of an operator of the plurality of operators and a parameter of the plurality of parameters;
generating a new explain node of the plurality of explain nodes by instantiating the new explain node as the object type specified by the mapping rule, wherein the new explain node comprises data in the current AST node as a member variable; and
adding the new explain node to a processing stack; and
storing, in the explain tree, the plurality of explain nodes remaining in the processing stack after the transforming of the plurality of AST nodes is complete;
sorting, using a dependency tree, the plurality of explain nodes in the explain tree to obtain a sorted list of the plurality of explain nodes,
wherein the dependency tree represents field dependencies between the plurality of fields in the form, and
wherein the sorted list comprises, for each dependent field of the plurality of fields an explain node representing the dependent field after the explain node representing a precedent field of the dependent field; and
generating the explanation of each explain node of the plurality of explain nodes in the sorted list by, for each explain node:
selecting a template matching the object type of the explain node, and
generating the explanation comprising filler words from the template and the member variable comprised in the explain node; and
output the explanation into a natural language.

14. The computer usable medium of claim 13, wherein receiving the input code comprises receiving a request specifying the form, and wherein the input code is obtained from the form based on the request.

15. The computer usable medium of claim 13, wherein the request is received by clicking on a button on the form.

16. The computer usable medium of claim 13, wherein the explanation allows completion of the form.

17. The computer usable medium of claim 13, wherein outputting the explanation is in text.

18. The computer usable medium of claim 13, wherein outputting the explanation is graphically based.

19. The method of claim 1, wherein the transforming of the plurality of AST nodes further comprises for each AST node of the plurality of AST nodes:
determining whether the new explain node and at least one contiguous subsequent explain node in the processing stack matches a reduction rule;
creating a reduced explain node from the new explain node and the at least one subsequent explain node based on the reduction rule when the new explain node and the at least one subsequent explain node matches the reduction rule; and
replacing the new explain node and the at least one subsequent explain node on the processing stack with the reduced explain node.

20. The system of claim 7, wherein the transforming of the plurality of AST nodes further comprises for each AST node of the plurality of AST nodes:
determining whether the new explain node and at least one contiguous subsequent explain node in the processing stack matches a reduction rule;
creating a reduced explain node from the new explain node and the at least one subsequent explain node based on the reduction rule when the new explain node and the at least one subsequent explain node matches the reduction rule; and
replacing the new explain node and the at least one subsequent explain node on the processing stack with the reduced explain node.

21. The computer readable medium of claim 13, wherein the transforming of the plurality of AST nodes further comprises for each AST node of the plurality of AST nodes:
determining whether the new explain node and at least one contiguous subsequent explain node in the processing stack matches a reduction rule;
creating a reduced explain node from the new explain node and the at least one subsequent explain node based on the reduction rule when the new explain node and the at least one subsequent explain node matches the reduction rule; and
replacing the new explain node and the at least one subsequent explain node on the processing stack with the reduced explain node.

* * * * *